Jan. 27, 1970     H. VON KOHORN ET AL     3,491,744
COMBINATION COOKING AND EATING DEVICE

Filed Feb. 21, 1966     3 Sheets-Sheet 1

Jan. 27, 1970  H. VON KOHORN ET AL  3,491,744
COMBINATION COOKING AND EATING DEVICE
Filed Feb. 21, 1966  3 Sheets-Sheet 2
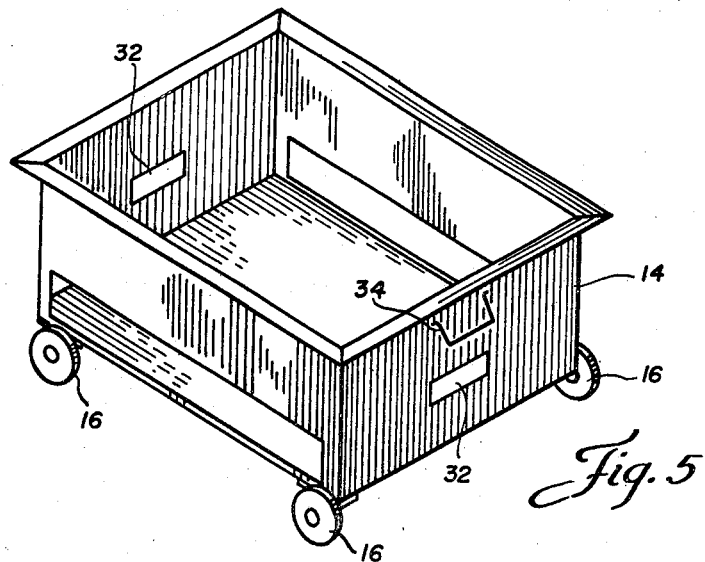
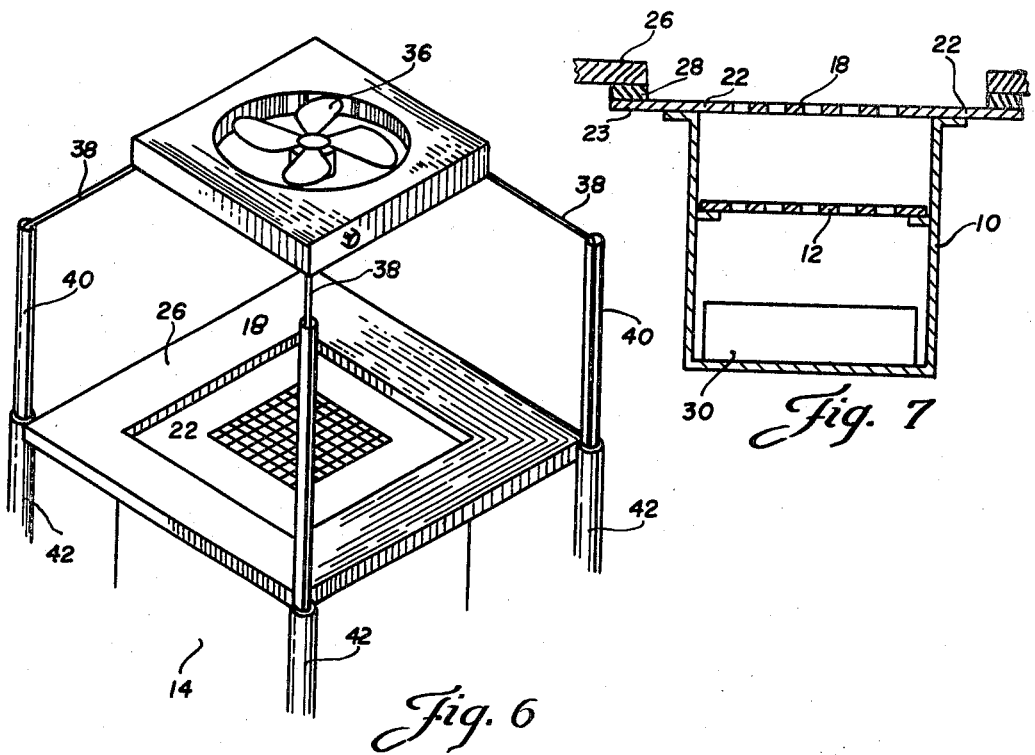

3,491,744
COMBINATION COOKING AND EATING DEVICE
Henry von Kohorn, Henry von Kohorn, Jr., Kenneth von Kohorn, Craig von Kohorn, David von Kohorn, Jeffrey von Kohorn, Marcy von Kohorn, and Robert von Kohorn, all of Pecksland Road, Greenwich, Conn. 06830
Filed Feb. 21, 1966, Ser. No. 529,116
Int. Cl. F24b 3/00; A47j 37/07
U.S. Cl. 126—25
10 Claims The present invention relates to a combination cooking and eating device in which a group of people can be located about the periphery thereof and each can individually cook his or her own food and eat the same on a shelf-like table surrounding, and within easy reach of the food preparation area of the device.

It is an object of the present invention to provide a combination cooking and eating device with a central, open-fire cooking means, and a surrounding metal hot plate or griddle means, both of which are surrounded by an eating counter. In addition, a portion of the metal hot plate is not directly over the open fire but nevertheless conducts heat and thereby functions as a warming device.

It is another object of the present invention to make the overall dimensions of the combination cooking and eating device such that all parts are within easy reach of individuals seated around the device, and the same individuals may carry on conversations in a normal manner.

A further object of the present invention is to provide a combination cooking and eating device which is constituted of a relatively few components that are easily transportable and easily assembled.

Another object of the present invention is to provide an exhaust fan mounted on said cooking and eating device in such a position that it serves as both a draft and exhaust unit to facilitate the starting up of the fire and to draw off heat and smoke emanating from the fire. It should also be apparent that the present device may be used effectively both outdoors and indoors.

The above and other features, objects and advantages of the present invention will be fully understood from the following description considered with the accompanying drawings.

FIG. 5 is a perspective view of the outer container for the fire box.

FIG. 6 is a perspective view of the exhaust fan means combined with our novel cooking and eating device.

FIG. 7 is a sectional view of an alternate embodiment of the present invention eliminating the outer container.

Figure 1:
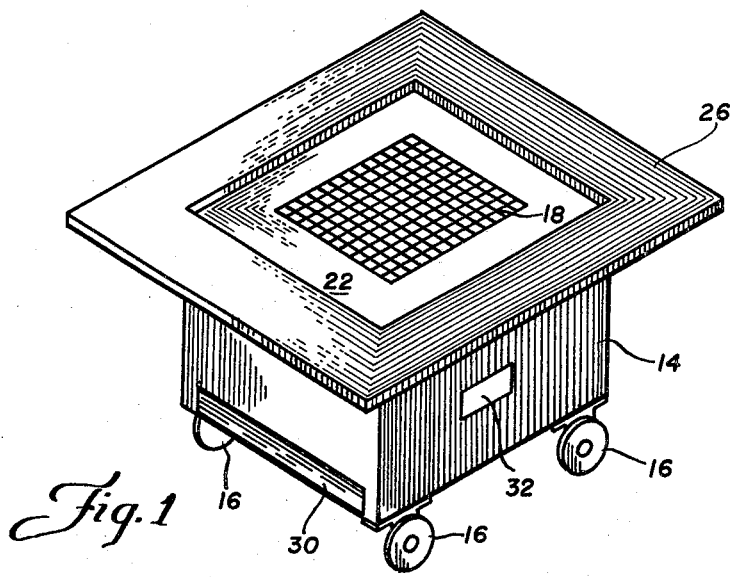
FIG. 1 is a perspective view of the cooking and eating device constructed in accordance with the teachings of the present invention.

Referring to the drawings and more particularly to FIGS. 1-5 thereof, the structure embodying the present invention comprises an inner open-ended fire box 10 which is here shown in a rectangular form, but may be circular or any other desirable shape. Although the fire box 10 is shown with a grate 12 for the placement thereon of charcoal or other combustible material B in an open fire arrangement, it is within the spirit and scope of the present invention to utilize other types of heating and cooking means, such as electric or gas burners. In addition, it should be noted that the present eating and cooking device can be used both outdoors and inside a building.

Preferably surrounding and heat-insulated from the inner fire box 10 is an outer container 14. The outer container is capable of being moved since it is supported on casters 16. The perforated open fire grill 18 rests on the upper edge 20 of the fire box 10. A hot plate griddle 22 is here shown integral with and surrounding the grill 18. The hot plate griddle, which is preferably metal and heat conducting, may be separate from the grill 18 and in the form of a rectangular ring surrounding the grill. Part 22a of the griddle is located over the fire box 10 and receives direct heat therefrom while part 22b of the griddle is separated from the fire box and receives heat only indirectly, and by virtue of the fact that the material of part 22b is heat conductive. Thus, the top surface of part 22b may be utilized as a warming surface.

Figure 2:
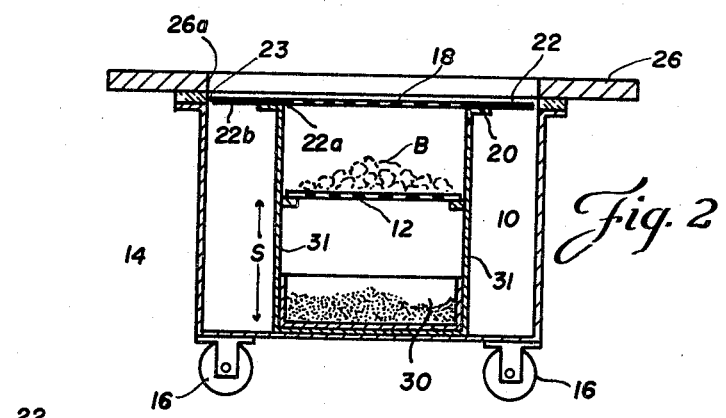
FIG. 2 is a sectional view of said cooking and eating device.
Figure 3:
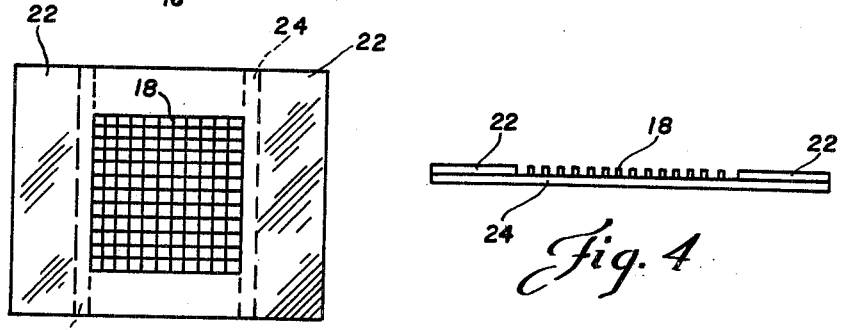
FIG. 3 is a top plan view of the combination grill and griddle unit utilized in our novel cooking and eating device.
Figure 4:
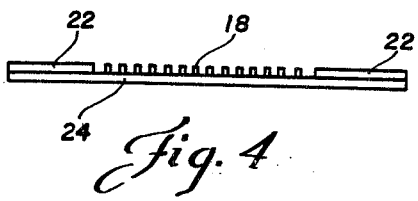
FIG. 4 is a side elevation view of the unit illustrated in FIG. 3.

The grill 18 and griddle 22 are shown in FIGS. 2-4 as a one-piece, unitary construction with reinforcing braces 24 to prevent warying of the unit inasmuch as it is subject to extreme temperature changes. The height of the charcoal bed may be adjusted as desired in a manner well known in the art.

Surrounding both the grill 18 and the griddle 22 is an eating counter 26 which is of a size sufficient for eating and/or serving. The eating counter is heat-insulated from both the griddle 22 and the fibre box 10. This may be accomplished by spacing the inner edge 26a of the counter from the outer edge 23 of the griddle 22, or by supporting the eating counter 26 on the outer edge 23 of the griddle 22 with a heat insulator 28 therebetween, as seen in FIG. 7. It sholud be apparent that many individuals may be seated around the periphery of the eating counter 26 within easy reach of both the grill 18 and the griddle 22. This permits each individual to cook, prepare and warm his own food, while carrying on a normal conversation with the other persons about the counter.

The bottom of the inner firebox 10 is spaced a distance S from the bottom of the outer container 14. In this space is located a pull-out drawer 30 of the outer container 14 for the collection of ashes falling through the grate 12. Vents 32 appear in the sides of the outer container 14 which together with apertures 31 in the lower portion of firebox 10 assist in the creation of an updraft for the charcoal bed B located on the grate 12. Handles 34 (only one shown) may be attached to the outer container to provide for ease in moving the device about.

FIG. 6 illustrates the present cooking and eating device in combination with an exaust fan 36 for drawing off both the heat and exhaust fumes. As shown, the fan 36 is mounted directly over the grill 18 and consequently the open fire, and the fan is supported by braces 38 inserted in the open ends of pipe standards 40. The latter are removably secured in sleeves 42 fixed on the sides of the outer container 14 of the device.

As seen in FIG. 7, it is also within the scope of the present invention to eliminate the outer receptacle 14 and merely construct a heat-insulated fire box 10 with the combination grill and griddle unit mounted directly on the upper edge of the fire box 10. It will be noted that the eating counter 26 is heat-insulated from the griddle 22 by means of insulator 28.

It should be apparent that the present cooking and eating device is fabricated of separate elements that are easily transported and assembled in a minimum of time.

It is also within the scope of the present invention to utilize a combination gas burner and grate for cooking purposes in which the grate is in the form of a perforated conductor for the cooking gas.

Figure 8:
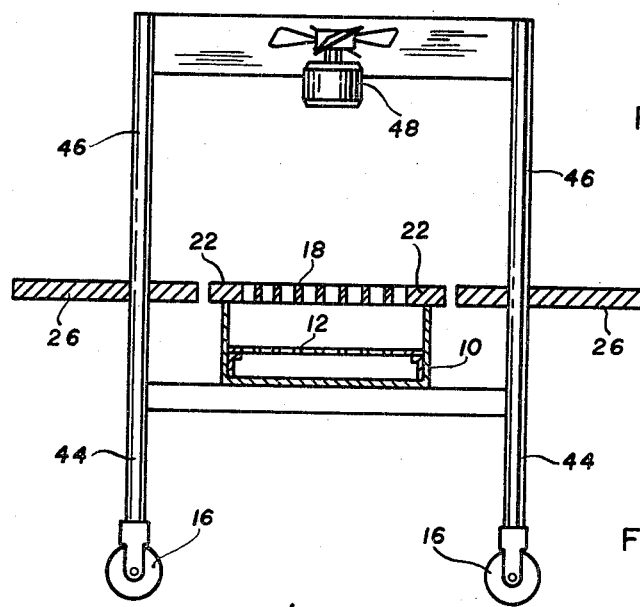
FIG. 8 is a sectional alternate view of the structure shown in FIG. 6.

FIG. 8 discloses an embodiment of the present invention similar to the structure illustrated in FIG. 6. However, the construction of FIG. 8 incorporates integral extensions of the legs 44 which form standards 46 for support of the exhaust fan and motor combination 48. As further seen in FIG. 8, grill 18, griddle 22 and eating counter 26 are located in-line, with the griddle 22 being spaced in a heat insulating manner from the counter 26.

Figure 9:
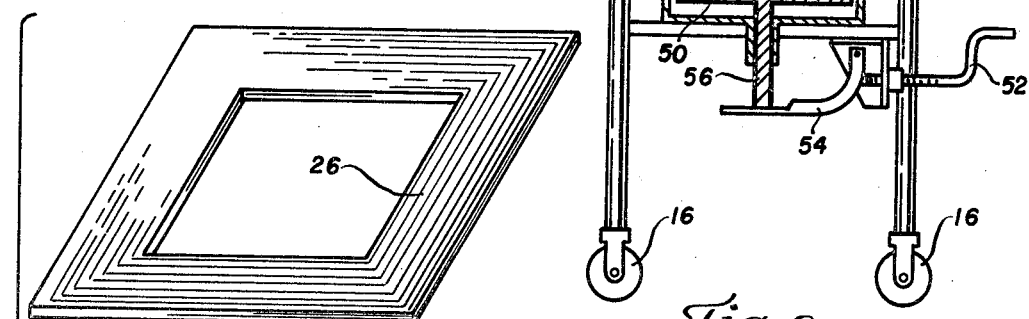
FIG. 9 is a sectional view of the device incorporating an electric heating unit and a pivoting arm for raising and lowering the same.

FIG. 9 shows a combination cooking and eating device provided with a heat generating means or electric heating means 50 for cooking purposes. The electric heating means 50 is illustrated in a lower position in full lines and in an upper position in dotted lines. The means for elevating and lowering the electric heating means takes the form of a crank 52 and a pivoting arm 54. The latter rests against rod 56 supporting the electric heating means 50. Thus, by turning the crank 52 in one direction or another the electric heating means 50 is caused to be raised or lowered to the desired level, thereby achieving the required heat transmission.

Figure 10:
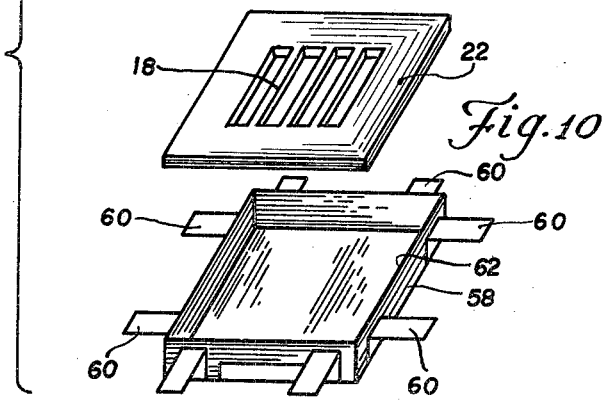
FIG. 10 is an exploded view of another modification of the device.

FIG. 10 is an exploded view of another modification of the present invention in which the receptacle 58 for the heating means is provided with heat-insulated, peripheral support arms 60. The grill 18 and griddle 22 are adapted to rest on edge 62 of the receptacle 58. The eating counter 26 is placed over both grill 18 and griddle 22, and rests on support arms 60 thereby surrounding both the receptacle 58 and the grill and griddle unit. It should be noted that the eating counter 26 will not be affected by the heat present in receptacle 58 since support arms 60 heat insulate the counter from the receptacle. The cooking deck in FIG. 9 comprises a central heating means 50 and a metal housing at least partially enclosing the heating means.

Figure 11:
FIGS. 11 and 12 are diagrammatic representations of an electric ignition means incorporated with our novel cooking and eating device.
Figure 12:
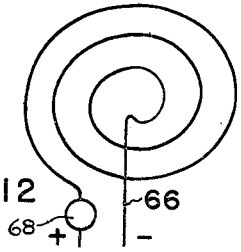

Some times it is also desirable to ignite the solid fuel in the fire box with an electric ignition means 64 or 66 as shown in FIGS. 11 and 12 respectively, which is connected to a timing device 68 (FIG. 12) that will cut off the electric ignition means after an elapsed time period.

What we claim is:

1. A cooking and eating device comprising an open-ended box accommodating heat generating means, a heat-conducting shelf having a central perforated grill portion located over said box and a substantially imperforate outer griddle portion with a part being located over said box and receiving direct heat therefrom and another part thereof being outside the upper edge of said box and receiving only indirect heat therefrom, and an eating counter extending laterally outwardly from said heat conducting shelf.

2. A cooking and eating device comprising an open-ended box accommodating heat generating means, a heat-conducting shelf having a central perforated grill portion located over said box and a substantially imperforate outer griddle portion with a part being located over said box and receiving direct heat therefrom and another part thereof being outside the upper edge of said box and receiving only indirect heat therefrom, an eating counter extending laterally outwardly from said heat conducting shelf, and heat insulation means between said counter and shelf.

3. A cooking and eating device comprising an outer container, an open-ended inner box accommodating heat generating means within said outer container and heat-insulated therefrom, a heat-conducting shelf having a central perforated grill portion located over said inner box and a substantially imperforate outer griddle portion, part of said outer griddle portion being located over said inner box and receiving direct heat therefrom, and another part thereof being outside the upper edge of said inner box and over the space between said inner box and said outer container and receiving only indirect heat from said inner box, at least one vent in said outer container opening into said space, and an aperture in the lower portion of said inner box opening into said space whereby an air draft passes through said vent and aperture to said heat generating means.

4. A cooking and eating device comprising an open-ended box accommodating heat generating means, a heat conducting shelf in which at least part thereof is perforated, said heat conducting shelf being supported on the open end of said box, and eating counter extending outwardly from said heat conducting shelf, and an exhaust fan located above said box, support means for said exhaust fan, and means removably securing said exhaust fan to said eating counter.

5. A cooking and eating device comprising an open-ended box accommodating heat generating means, a heat conducting shelf in which at least part thereof is perforated, said heat conducting shelf being supported on the open end of said box, an eating counter extending outwardly from said heat conducting shelf, heat insulation means between said counter and shelf, an exhaust fan located above said box, support means for said exhaust fan, and means removably securing said exhaust fan to said box.

6. A cooking and eating device comprising an open-ended box accommodating heat generating means, a heat conducting shelf in which at least part thereof is perforated, said heat conducting shelf being supported on the open end of said box, an eating counter extending outwardly from said heat conducting shelf, heat insulation means between said counter and shelf, an exhaust fan located above said box, support means for said exhaust fan, and means removably securing said exhaust fan to said heat conducting shelf.

7. A cooking and eating device as claimed in claim 1 further comprising a grate in said box adapted to support solid combustible material underneath said grill, and means for adjusting the distance between said grill and said grate.

8. A cooking and eating device as claimed in claim 1 further comprising a perforated hollow conductor underneath said grill and forming a gas burner for cooking gas, and means for adjusting the distance between said grill and said gas burner.

9. A cooking and eating device as claimed in claim 1 further comprising a grate in said box adapted to support solid combustible material underneath said grill, said grate being adapted to be utilized as an electrical heat generating means, and means for adjusting the distance between said grill and said grate.

10. A cooking and eating device as claimed in claim 1 further comprising an exposed electrical heat generating means located under said perforated grill portion and a partially encased electrical heat generating means located under said substantially imperforate griddle portion, and means for activating the exposed and the partially encased heat generating means alternatively and jointly.

(References on following page)

References Cited

UNITED STATES PATENTS

| | | | |
|---|---|---|---|
| 1,489,216 | 4/1924 | Hurst | 99—450 |
| 2,898,846 | 8/1959 | Del Francia | 126—41 X |
| 2,903,549 | 9/1959 | Joseph | 126—41 X |
| 3,033,191 | 5/1962 | Bonadiman | 126—25 |
| 3,119,387 | 1/1964 | Beller | 126—25 |
| 3,241,543 | 3/1966 | Hirsch | 126—41 X |
| 3,277,881 | 10/1966 | Bruns | 126—40 |
| 3,303,839 | 2/1967 | Tavan | 126—299 |

EDWARD G. FAVORS, Primary Examiner

U.S. Cl. X.R.

99—450